(12) United States Patent
Davenport et al.

(10) Patent No.: US 6,816,280 B1
(45) Date of Patent: Nov. 9, 2004

(54) ALDC WITH ZERO CLEAR AFTER READ

(75) Inventors: Perry E. Davenport, Longmont, CO (US); Timothy D'Avis, Superior, CO (US); Larry David Teklits, Loveland, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/550,350

(22) Filed: Apr. 14, 2000

(51) Int. Cl.[7] .............................................. G06F 15/00
(52) U.S. Cl. ..................... 358/1.16; 358/1.15; 358/1.17
(58) Field of Search .............................. 358/1.16, 1.15, 358/1.17, 1.14; 711/100, 118

(56) References Cited

U.S. PATENT DOCUMENTS 5,216,754 A * 6/1993 Sathi et al. ................ 358/1.14
5,590,304 A * 12/1996 Adkisson .................... 711/100

* cited by examiner

Primary Examiner—Twyler Lamb
(74) Attorney, Agent, or Firm—Rabindranath Dutta; Konrad Raynes & Victor LLP

(57) ABSTRACT

A page generation system that efficiently generates a page segment by clearing memory immediately after data representing the page segment is read from memory. The system generates a page in memory by writing the data representing the image content of the page to a memory block. The memory block is initially clear (all logical 0's) to enable the system to efficiently generate the page segment by writing the positive content of the page segment without having to write the blank sections of the page segment. By clearing memory immediately after data is read from memory, the page generator does not need to zero clear a memory block prior to constructing a page segment therein.

35 Claims, 3 Drawing Sheets ency of the system 10 is further reduced when a C/D is employed. After a page is constructed in memory the page is compressed until it can be transmitted. After converting the signal into a compressed signal and storing it in the storage unit 12, the memory block must be cleared. The combination of read and write cycles required to 1) construct a page in memory; 2) read the constructed page from memory; 3) compress the constructed page; 4) write the compressed, constructed page to memory; 5) clear the sections of memory; and 6) read the compressed, constructed page from memory so it may be decompressed, converted, and transmitted may severely limit the throughput of the page generator 10. A more efficient page generator is needed, in particular in systems employing data compression.

ALDC WITH ZERO CLEAR AFTER READ

CROSS REFERENCE TO RELATED APPLICATION

This application is related to copending commonly assigned patent application Ser. No. 09/549,803 entitled "Dual ADLC Decompressors Inside Printer ASIC," filed the same date herewith, assigned to the Assignee hereof and is incorporated by reference herein.

BACKGROUND OF THE INVENTION

1. Field of the Invention

This invention relates to page generation systems, and more particularly to generating one or more bands of a page from a print data signal.

2. Description of Related Art

Page generators are used to generate pages for screen images, printed pages, and other viewable mediums. FIG. 1 is a block diagram of a prior art page generator 10. The generator 10 includes a page generation controller 70, a data storage unit 12, and a data transformer/manipulator 15. The page generation controller 70 receives data signals representing a page to be built. The page generation controller 70 in conjunction with the data storage unit 12 and data transformer 15 convert received signals into transmit signals that represent one or more bands of a page, i.e., generates a page from the received signals.

The page generation controller 70 buffers received data signals in the data storage unit 12. The signal is typically buffered because data signals are received at a faster data rate than they are transmitted. The signal may also be buffered because it represents an encoded signal. Further, the controller 70 may buffer the received signal until sufficient data has been received to generate one or more bands of a page. In each scenario, the controller 70 buffers the received signal in the data storage unit 12 where the data storage unit may be a form of random access memory ("RAM") or other storage medium (including magnetic and optical medium).

In order to reduce the required capacity of the storage unit 12, the page generation controller 70 may include a compressor/decompressor ("C/D"). The C/D compresses the received data signal prior to storage in the data storage unit 12. Preferably, the received data is compressed and decompressed using a loss-less compression and decompression algorithm such as Adaptive Lossless Data Compression ("ALDC"), which is well known by those of ordinary skill in the art. See, for example, commonly assigned U.S. Pat. No. 5,572,209 "Method and apparatus for compressing and decompressing data," to Farmer et al. issued Nov. 5, 1996.

The controller 70 buffers the received data signal for several reasons. When the data signal represents an encoded signal, the encoded signal is decoded to generate a page. Data transformer 15 generates the page based on the corresponding encoded signals. Data transformer 15 typically converts the encoded signal into bands of a page and then stores the page in the data storage unit 12. A block of memory is dedicated to the page. The encoded signal generally represents an area of a page that contains data to be printed. In order to expedite the construction of a page, the data transformer 15 in conjunction with the controller 70 only write to those areas of the memory block that represent data on a page, not areas of the page that are blank. Accordingly, when constructing a page in memory the memory block representing the page must be initially clear.

In prior art controllers 70, after a page is generated, retrieved from storage 12, and converted to a transmit signal, the entire corresponding memory block is typically cleared. This process is inefficient because it consumes additional write cycles, thus reducing the potential throughput of the page generator 10. The performance of the system 10 is

SUMMARY OF THE INVENTION

The present invention provides an efficient page generation system. The system writes data representing a page segment image to a memory block. This effectively generates the page segment provided the memory block is initially clear, i.e., only the page segment positive image content is written to memory. Data stored in the memory block representing the page segment is read and the data stored in the memory block is cleared immediately after reading the data. Accordingly, the memory block is clear after constructing the page segment. Thus, additional page segments may be constructed in the memory block by directly writing the page segment image to the memory block. In a preferred embodiment, a memory location is read and cleared during a single bus cycle and during a single bus request execution.

Compression can be used to conserve memory usage. In a preferred embodiment, page segments are compressed and stored in memory blocks. A memory block is cleared as the compressed page stored therein is read.

BRIEF DESCRIPTION OF THE DRAWINGS

Like reference numbers and designations in the various drawings indicate like elements.

DETAILED DESCRIPTION OF THE PREFERRED EMBODIMENTS

Throughout this description, the preferred embodiment and examples shown should be considered as exemplars, rather than as limitations on the present invention.

Figure 1:
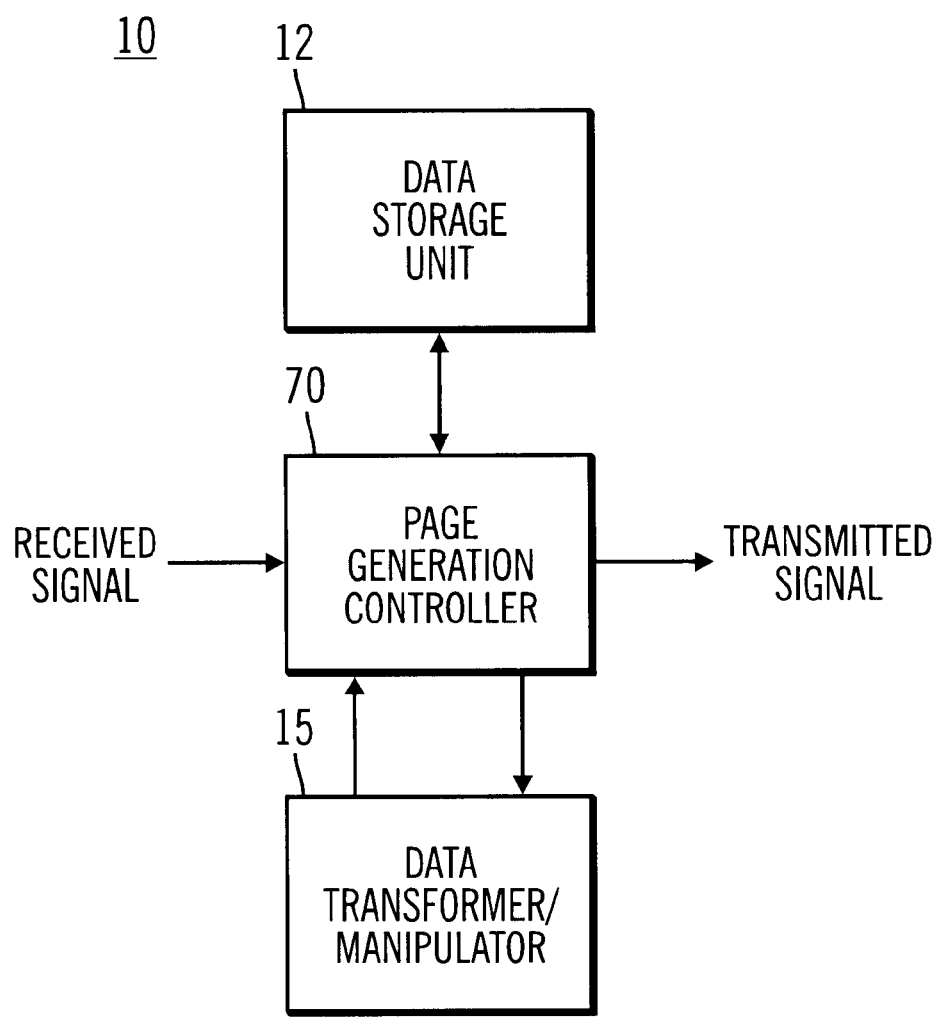
FIG. 1 is a block diagram of a prior art page generator.
Figure 2:
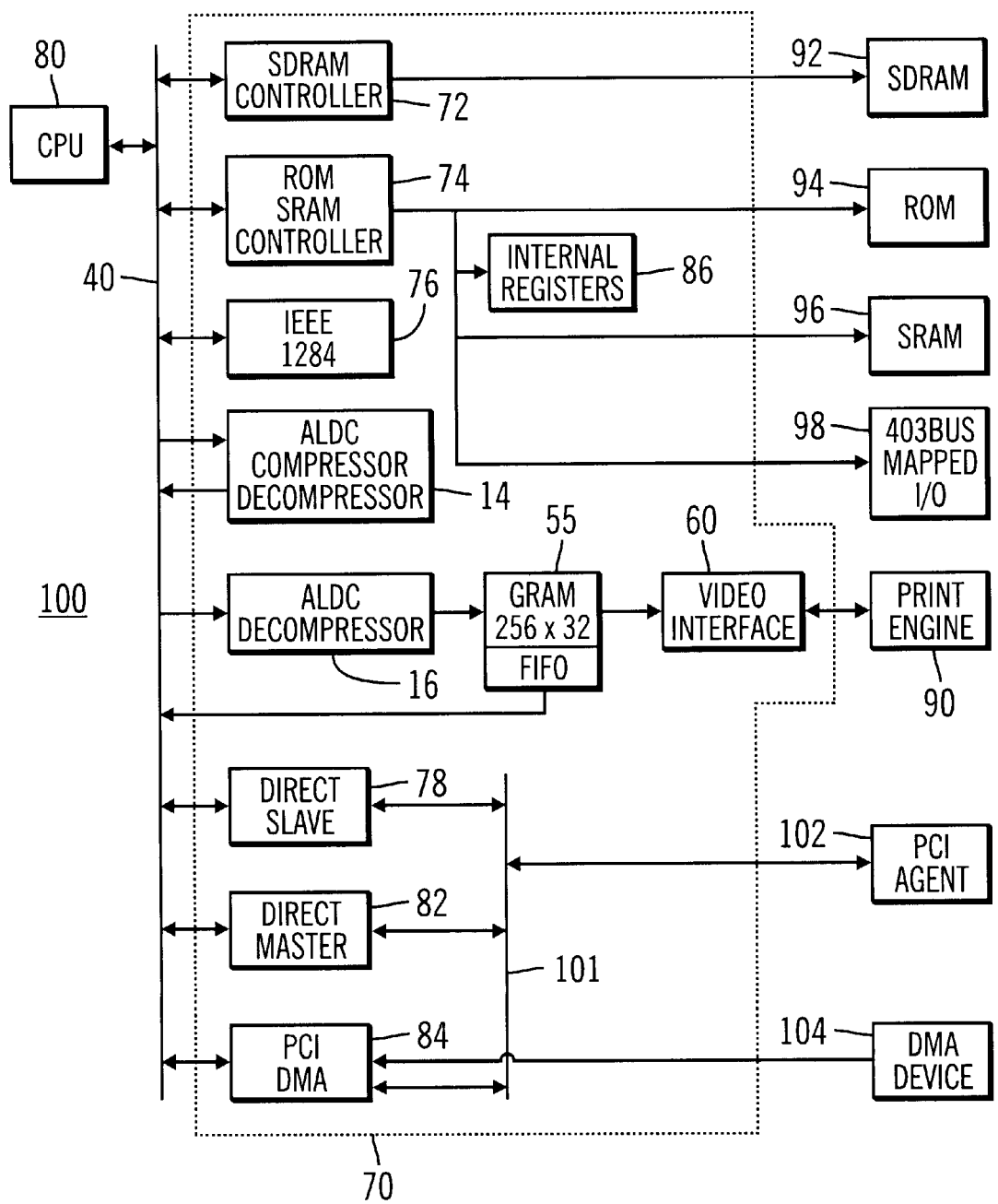
FIG. 2 is a block diagram of a printer system including a page generator according to an embodiment of the present invention.

FIG. 2 is a block diagram of a printer system 100 with a page generator according to a preferred embodiment. Printing system 100 includes a main central processing unit ("CPU") 80, local bus 40, page generation controller 70 (a printer application specific integrated circuit ("PASIC") in this embodiment), data storage units 92, 94, and 96, bus mapped input/output ("I/O") controller 98, print engine 90, peripheral component interface ("PCI") agent 102, and direct memory access ("DMA") device 104. The page generator includes all the components of the printing system 100 except the print engine 90. If the print engine 90 is substituted with a screen display engine, for example, the printing system 100 could be used to generate pages for other viewable mediums.

The CPU 80 is a microprocessor such as a PowerPC, Intel®, AMD®, or Cyrix® microprocessor. As shown in FIG. 2, the data storage units 92, 94, and 96 include synchronous dynamic random access memory ("SDRAM") 92, read only memory ("ROM") 94 and synchronous RAM ("SRAM") 96. Any form of RAM or data storage such as magnetic or optical storage may be used in place of units 92 and 96 in this preferred embodiment.

PASIC 70 includes an SDRAM controller 72, a ROM/SRAM controller 74, internal registers 86, an IEEE 1284 interface 76, an ALDC compressor/decompressor 14, an ALDC compressor 16, a graphics RAM ("GRAM") system 55, a video interface 60, a direct slave buffer 78, a direct master buffer 82, a PCI/DMA buffer 84, and an internal bus 101. The SDRAM controller 72 is coupled to the local bus 40 and SDRAM 92 and controls access to the SDRAM 92 via the local bus 40. Likewise, the ROM/SRAM controller 74 is coupled to the ROM 94 and SRAM 96 and local bus 40 and controls access to the ROM 94 and SRAM 96 via the local bus 40. The direct slave buffer 78, direct master buffer 82, and PCI DMA buffer 84 are coupled to the local bus 40 and internal bus 101. The internal bus 101 is also coupled to the PCI agent 102 and DMA device 104. The buffers 78, 82, and 84, PCI agent 102, and DMA device 104 are used to place data on the local bus 40 for routing to the SDRAM controller 72, ROM/SRAM controller 74, and ALDC compressor/decompressor ("C/D") 14, and decompressor 16.

ALDC C/D 14 receives uncompressed and compressed data on local bus 40. ALDC C/D 14 compresses the uncompressed data, decompresses the compressed data, and returns the processed data to local bus 40. The C/D 14 compresses data for storage in a memory unit 92 or 96. In PASIC 70, the data may represent received data to be constructed into a page (or one or more bands of a printed page) where the received data is encoded in a printer encoding language such as Postscript, printer control language ("PCL"), intelligent printer data stream ("IPDS") or other printer languages. The data to be compressed may also represent a constructed page or one or more bands of a printed page where the page has been constructed and stored in one of the data storage units 92 and 96. The C/D 14 may also decompress encoded data stored in the memory units 92 and 96. The decompressor 16 decompresses compressed, constructed pages (or bands thereof) stored in the memory units 92 and 96.

In order to build a page to be printed via the print engine 90 when the received data is encoded data, the encoded data may need to be decoded (transformed) from the printer language to a different form usable by the print engine 90 (and video interface 60 in this preferred embodiment.) The CPU 80 may decode the decompressed, encoded printer data into a usable format (such as bit-mapped image data). In order for the CPU 80 to efficiently construct a page or one or more bands of a page, the CPU 80 only generates data that corresponds to information or the positive image on the page.

It is advantageous for CPU 80 not to have to write to locations of the memory 92 or 96 that represent blank portions of the constructed page while constructing the page. Accordingly, the block of the memory unit 92 or 96 that represents the constructed page (or one or more bands thereof) is initially clear prior to the construction of the page. In a preferred embodiment, because each section of memory is clear when not is use any memory block may used to construct a page. After any byte of data is read from a location of memory, the location of the byte of data is cleared (written with the value logical 0), i.e., each location is cleared by a write operation immediately after a read operation.

Figure 3:
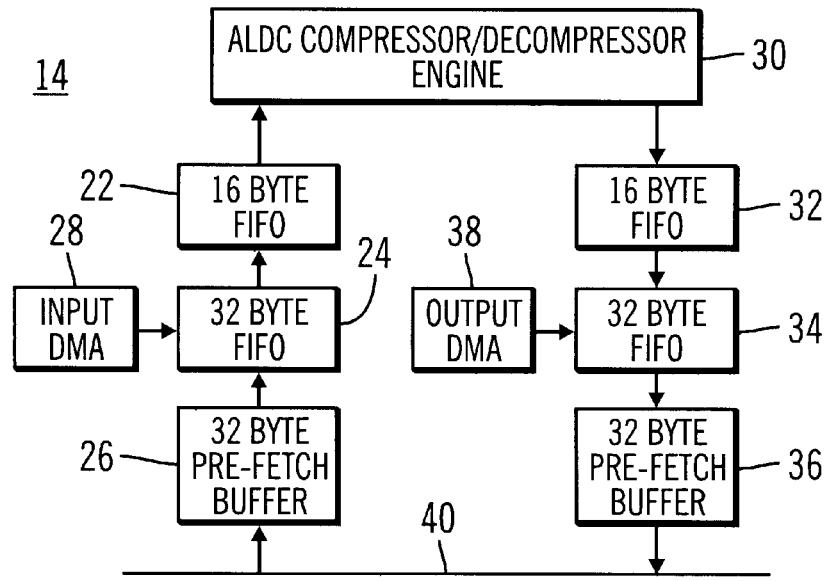
FIG. 3 is a block diagram of a preferred embodiment of an ALDC compressor/decompressor in accordance with the present invention.

In order to conserve memory resources, the preferred embodiment uses the C/D 14 shown in FIG. 3. After a page is constructed in memory, C/D 14 compresses the page for storage in a memory unit 92 or 96 for printing at a later point. When data representing a constructed page is read from memory unit 92 or 96 to be compressed by C/D 14 in a pre-fetch operation, the corresponding section of the memory unit 92 or 96 is overwritten by a "0" (or cleared). Similarly when compressed data is read from a location of memory unit 92 or 96 by C/D 14 to be decompressed by the C/D 14, the location of the memory unit 92 or 96 is overwritten by "0" as the data is pre-fetched. The C/D 14 may retrieve compressed data from the memory unit 92 or 96 where the data represents compressed, received data to be decompressed and constructed into a page.

PASIC 70 may include a second decompressor 16, as described in the copending and commonly assigned application entitled "Dual ADLC Decompressors Inside Printer ASIC," which was incorporated by reference. The second ALDC decompressor 16 decompresses compressed, constructed page data stored in the memory unit 92 or 96. The ALDC decompressor 16 receives compressed, constructed page data from the local bus 40 and decompresses the constructed page data for storage in the GRAM 55. Similar to C/D 14, when compressed data is read from memory unit 92 or 96 by decompressor 16 to be decompressed, the corresponding location of the memory unit 92 or 96 is overwritten by "0" as the data is pre-fetched. Thus, whenever data is read from a memory location the location is immediately cleared. Consequently, memory not in use is always clear so any section of memory not in use may be used to construct a page. In the PASIC 70, data read memory units 92 or 96 is cleared during the read memory access request to reduce memory requests and overhead.

The C/D 14 can decompress received, compressed page data to be constructed into a page while decompressor 16 can decompress constructed, compressed page or printer data (constructed pages or one or more bands of a page) simultaneously. The video interface 60 reads decompressed, constructed page or printer data from the GRAM 55 and converts the data into a format capable of use by the print engine 90. The print engine 90 receives formatted printer data from the video interface 60 and generates a hard copy representation of the formatted, constructed page data. The print engine 90 may be any type of printer engine including Light Amplification by Stimulated Emission of Radiation ("LASER"), Light-Emitting Diode ("LED"), dot matrix or ink-jet based print engines. Accordingly, the preferred embodiment of the PASIC 70 may be used to efficiently process printer data while conserving memory usage by losslessly compressing or decompressing the printer data during page construction.

FIG. 3 is a block diagram of a preferred embodiment of an ALDC compressor/decompressor 14. The ALDC C/D 14 includes ALDC compressor/decompressor engine 30, 32-byte pre-fetch input buffer 26, 32-byte input first in first out ("FIFO") 24, input DMA 28, 16-byte input FIFO 22, 32-byte pre-fetch output buffer 36, 32-byte output FIFO 34, output DMA 38, and 16-byte output FIFO 32. The 32-byte input pre-fetch buffer 26 and 32-byte pre-fetch output buffer 36 are coupled to the local bus 40. The 32-byte input pre-fetch buffer 26 receives compressed data and uncompressed data where the data is to be decompressed and compressed by the ALDC C/D engine 30. The 32-byte input FIFO 24, input DMA 28, and 16-byte FIFO 22 in combination convert 32-byte data words stored in the 32-byte pre-fetch buffer 26 into 16-byte data words for processing by ALDC C/D engine 30.

Likewise, the 16-byte output FIFO 32, 32-byte output FIFO 34, and output DMA 38 convert 16-byte data words generated by ALDC C/D engine 30 into 32-byte data words. The 32-byte data words generated by 32-byte output FIFO 34 are buffered by 32-byte pre-fetch output buffer 36 for transmission over local bus 42 to a memory unit 92 and 96. In operation, when the ALDC engine 30 is able to process data, the DMA device 104 directs one of the SDRAM controller 72 and ROM/SRAM Controller 74 to retrieve a 32 byte data word from the SDRAM 92 or SRAM 96 and then zero clear the memory location of the 32 byte data word. In one preferred embodiment, the read and zero clear is performed by the execution of a burst read operation followed a burst write operation. This technique saves bus cycles and bus requests. When a DMA start address or DMA terminal address is not aligned with a 32-byte word boundary, the request to zero clear the memory location after read is performed by the execution of only a burst read operation so data outside the boundary is not altered.

Figure 4:
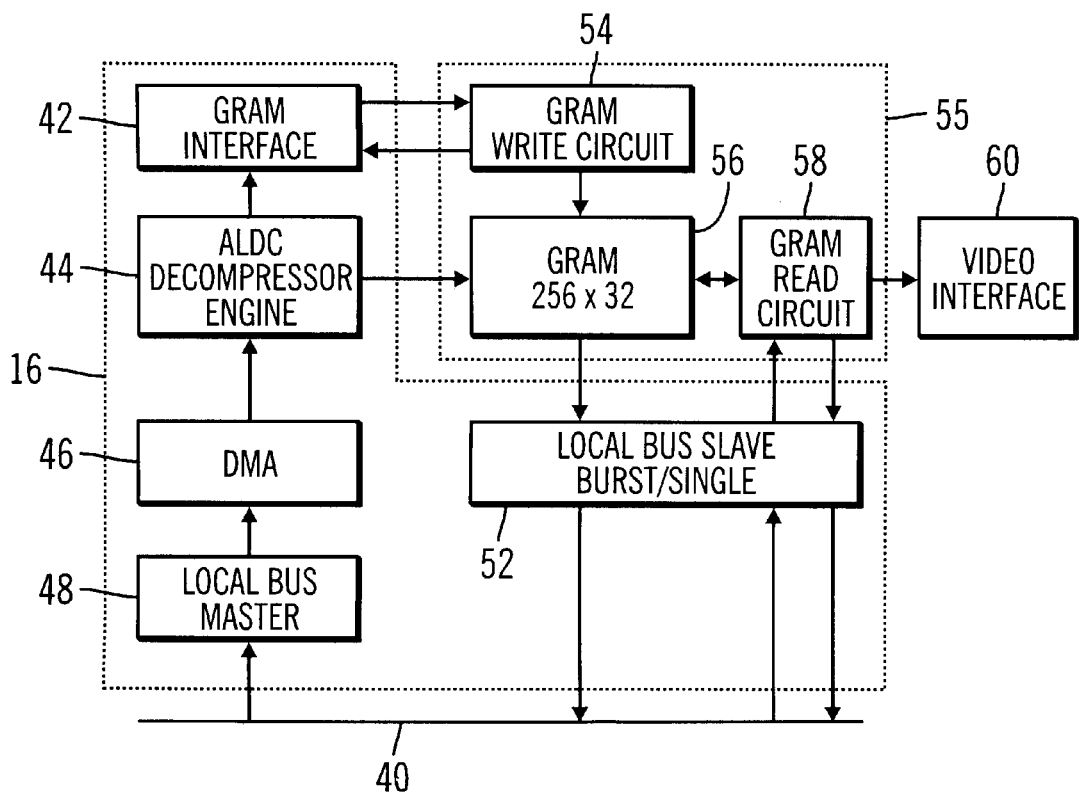
FIG. 4 is a block diagram of a preferred embodiment of an ALDC decompressor coupled to a printer preprocessing system in accordance with the present invention.

A preferred embodiment of an ALDC decompressor 16 and GRAM system 55 for use in the PASIC 70 is shown in FIG. 4. The ALDC decompressor 16 includes a local bus master interface 48, DMA controller 46, ALDC decompressor engine 44, GRAM interface 42, and local bus slave 52. The GRAM system 55 includes a GRAM write circuit 54, GRAM memory 56, and GRAM read circuit 58. The local bus master interface 48 is coupled to the local bus 40 and ALDC decompressor engine 44 via the DMA controller 46. The GRAM interface 42 of the decompressor 16 is coupled to the ALDC decompressor engine 44 and GRAM system 55 via the GRAM write circuit 54. The local bus master interface 48 and DMA controller 46 function to retrieve data words from the local bus 40 to provide the data words to the ALDC decompressor engine 44 where the data words represent compressed build page data to be decompressed. When ALDC decompressor engine 44 is able to process data, the DMA controller 46 directs one of the SDRAM controller 72 and ROM/SRAM controller 74 to retrieve a 32-byte data word from the SDRAM 92 or SRAM 96 and then zero clear the memory location of the 32-byte data word. The read and zero clear of a memory location is performed by the execution of a burst read operation followed a burst write operation. When a DMA start address or DMA terminal address is not aligned with a 32-byte word boundary, the request to zero clear the memory location after read is performed by the execution of only a burst read operation so data outside the boundary is not altered.

The ALDC decompressor engine 44 decompresses the page data words received from the local bus 40 via the local bus master interface 48 and the DMA controller 46. The decompressed page data words generated by the ALDC compressor engine 44 are stored in the GRAM memory 56. The decompressed data words are stored in the GRAM memory 56 under the control of the GRAM interface 42 and the GRAM write circuit 54. The GRAM read circuit 58 passes the decompressed data words stored in the GRAM memory 56 to the video interface 60 for further processing. The local bus slave 52 may transmit decompressed data words stored in the GRAM memory 56 to the local bus 40. The decompressed data words represent a constructed page or one or more bands of a page.

In the preferred embodiment shown in FIG. 2, the page generation controller is incorporated in a printer ASIC 70. The page generation controller may be incorporated in many different types of ASICs including, for example, a screen display ASIC. Accordingly, it is to be understood that the invention is not to be limited by the specific illustrated embodiment, but only by the scope of the appended claims.

While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution.

What is claimed is:

1. A method of constructing a page segment comprising the steps of:
   a) writing data representing a page segment image to a memory block comprising a plurality of memory locations;
   b) reading the data stored in the memory block representing the page segment; and
   c) clearing the data stored in the memory block in response to reading the data, and before an additional page segment is constructed in the cleared memory block, wherein the memory block is clear after constructing the page segment, and wherein a memory location in the memory block is read and cleared in a single bus cycle.

2. The method of constructing a page segment of claim 1, wherein the memory block comprises a plurality of memory locations and step b) and step c) further comprise:
   i) reading the data stored in a first memory location of the plurality of memory locations and clearing the first memory location after reading the data stored therein.

3. The method of constructing a page segment of claim 1, wherein the memory block comprises a plurality of memory locations and step b) and step c) further comprise:
   i) reading the data stored in a first memory location of the plurality of memory locations and writing the value logical 0 to the first memory location after reading the data stored therein.

4. The method of constructing a page segment of claim 3, wherein step i) is performed in a single bus cycle.

5. The method of constructing a page segment of claim 4, wherein step i) is performed by the execution of a single bus request.

6. The method of constructing a page segment of claim 1, further comprising the steps of:
   d) compressing the page segment;
   e) storing the compressed page segment in a second memory block;
   f) reading the data stored in the second memory block representing the compressed page segment; and
   g) clearing the data stored in the second memory block immediately after reading the data.

7. The method of constructing a page segment of claim 6, wherein the memory block comprises a plurality of memory locations and step b) and step c) further comprise:
   i) reading the data stored in a first memory location of the plurality of memory locations and clearing the first memory location after reading the data stored therein.

8. The method of constructing a page segment of claim 7, wherein the second memory block comprises a second plurality of memory locations and step f) and step g) further comprise:
   i) reading the data stored in a first memory location of the second plurality of memory locations and clearing the first memory location after reading the data stored therein.

9. The method of constructing a page segment of claim 6, wherein the memory block comprises a plurality of memory locations and step b) and step c) further comprise:
   i) reading the data stored in a first memory location of the plurality of memory locations and writing the value logical 0 to the first memory location after reading the data stored therein.

10. The method of constructing a page segment of claim 9, wherein the second memory block comprises a second plurality of memory locations and step f) and step g) further comprise:
    i) reading the data stored in a first memory location of the second plurality of memory locations and writing the value logical 0 to the first memory location after reading the data stored therein.

11. The method of constructing a page segment of claim 10, wherein step i) is performed in a single bus cycle.

12. The method of constructing a page segment of claim 11, wherein step i) is performed by the execution of a single bus request.

13. The method of claim 1, wherein the memory location is read and cleared during a single bus request execution.

14. An article of manufacture for use in constructing a page segment, the article of manufacture comprising computer readable storage media including program logic embedded therein that causes control circuitry to perform the steps of:
    a) writing data representing a page segment image to a memory block comprising a plurality of memory locations;
    b) reading the data stored in the memory block representing the page segment; and
    c) clearing the data stored in the memory block in response to reading the data, and before an additional page segment is constructed in the cleared memory block, wherein the memory block is clear after constructing the page segment, and wherein the memory sock comprises a plurality of wherein a memory location in the memory block is read and cleared in a single bus cycle.

15. The article of manufacture for use in constructing a page segment of claim 14, wherein the memory block comprises a plurality of memory locations and step b) and step c) further comprise:
    i) reading the data stored in a first memory location of the plurality of memory locations and clearing the first memory location after reading the data stored therein.

16. The article of manufacture for use in constructing a page segment of claim 14, wherein the memory block comprises a plurality of memory locations and step b) and step c) further comprise:
    i) reading the data stored in a first memory location of the plurality of memory locations and writing the value logical 0 to the first memory location after reading the data stored therein.

17. The article of manufacture for use in constructing a page segment of claim 16, wherein step i) is performed in a single bus cycle.

18. The article of manufacture for use in constructing a page segment of claim 17, wherein step i) is performed by the execution of a single bus request.

19. The article of manufacture for use in constructing a page segment of claim 14, further comprising the steps of:
    d) compressing the page segment;
    e) storing the compressed page segment in a second memory block;
    f) reading the data stored in the second memory block representing the compressed page segment; and
    g) clearing the data stored in the second memory block immediately after reading the data.

20. The article of manufacture for use in constructing a page segment of claim 19, wherein the memory block comprises a plurality of memory locations and step b) and step c) further comprise:
    i) reading the data stored in a first memory location of the plurality of memory locations and clearing the first memory location after reading the data stored therein.

21. The article of manufacture for use in constructing a page segment of claim 20, wherein the second memory block comprises a second plurality of memory locations and step f) and step g) further comprise:
    i) reading the data stored in a first memory location of the second plurality of memory locations and clearing the first memory location after reading the data stored therein.

22. The article of manufacture for use in constructing a page segment of claim 19, wherein the memory block comprises a plurality of memory locations and step b) and step c) further comprise:
    i) reading the data stored in a first memory location of the plurality of memory locations and writing the value logical 0 to the first memory location after reading the data stored therein.

23. The article of manufacture for use in constructing a page segment of claim 22, wherein the second memory block comprises a second plurality of memory locations and step f) and step g) further comprise:
    i) reading the data stored in a first memory location of the second plurality of memory locations and writing the value logical 0 to the first memory location after reading the data stored therein.

24. The article of manufacture for use in constructing a page segment of claim 23, wherein step i) is performed in a single bus cycle.

25. The article of manufacture for use in constructing a page segment of claim 24, wherein step i) is performed by the execution of a single bus request.

26. The article of manufacture of claim 14, wherein the memory location is read and cleared during a single bus request execution.

27. An apparatus for constructing a page segment, comprising:
   a) means for writing data representing a page segment image to a memory block comprising a plurality of memory blocks;
   b) means for reading the data stored in the memory block representing the page segment; and
   c) means for clearing the data stored in the memory block in response to reading the data, and before an additional page segment is constructed in the cleared memory block, wherein the memory block is clear after constructing the page segment, and wherein a memory location in the memory block is read and cleared in a single bus cycle.

28. The apparatus for constructing a page segment of claim 27, wherein the memory block comprises a plurality of memory locations and the means for reading and the means for clearing comprise means for reading the data stored in each memory location of the plurality of memory locations and clearing each memory location after reading the data stored therein.

29. The apparatus for constructing a page segment of claim 27, wherein the memory block comprises a plurality of memory locations and the means for reading and the means for clearing comprise means for reading the data stored in each memory location of the plurality of memory locations and writing the value logical 0 to each memory location after reading the data stored therein.

30. The apparatus for constructing a page segment of claim 27, further comprising:
   d) means for compressing the page segment;
   e) means for storing the compressed page segment in a second memory block;
   f) second reading means for reading the data stored in the second memory block representing the compressed page segment; and
   g) second clearing means for clearing the data stored in the second memory block immediately after reading the data.

31. The apparatus for constructing a page segment of claim 30, wherein the memory block comprises a plurality of memory locations and the means for reading and the means for clearing comprise means for reading the data stored in each memory location of the plurality of memory locations and clearing each memory location after reading the data stored therein.

32. The apparatus for constructing a page segment of claim 31, wherein the second memory block comprises a second plurality of memory locations and the second reading means and the second clearing means comprise means for reading the data stored in each memory location of the second plurality of memory locations and clearing each memory location after reading the data stored therein.

33. The apparatus for constructing a page segment of claim 30, wherein the memory block comprises a plurality of memory locations and the means for reading and the means for clearing comprise means for reading the data stored in each memory location of the plurality of memory locations and writing the value logical 0 to each memory location after reading the data stored therein.

34. The apparatus for constructing a page segment of claim 33, wherein the second memory block comprises a plurality of memory locations and the second reading means and the second clearing means comprise means for reading the data stored in each memory location of the second plurality of memory locations and writing the value logical 0 to each memory location after reading the data stored therein.

35. The apparatus of claim 27, wherein the memory location is read and cleared during a single bus request execution.

\* \* \* \* \*